2,833,747
Patented May 6, 1958

2,833,747
EPOXIDIZED HYDROCARBON RESINS

Frank P. Greenspan, Buffalo, and Rupert E. Light, Jr., Kenmore, N. Y., assignors, by mesne assignments, to Food Machinery and Chemical Corporation, San Jose, Calif., a corporation of Delaware No Drawing. Application October 20, 1954
Serial No. 463,622

2 Claims. (Cl. 260—82)

This invention pertains to epoxidized hydrocarbon resins and particularly to epoxidized polymers of olefin hydrocarbons.

Epoxy polymers, presently in commercial production and described in the literature, are the products of a condensation reaction. More particularly, the epoxy polymers known by the trade name "Epon" and "Araldite" are produced by the condensation of epichlorohydrin with polyhydric alcohols or phenols and especially by the condensation of epichlorohydrin with bisphenol. These useful epoxy polymers have certain characteristics. They are diglycidyl ethers and have two epoxy groups only which epoxy groups are in the terminal position; that is to say, they are in the 2,3 position to the ether linkage. These diglycidyl ethers, which are formed initially in condensation reactions of the type described, have a tendency to condense further with the phenolic reactant so that the final product obtained is a mixture of polymers of varying molecular weight. Preparation of a product of uniform molecular weight is, therefore, difficult. If it be desired to obtain condensation products of relatively low and uniform molecular weight by condensing epichlorohydrin with a polyhydric alcohol or a phenol, an uneconomical excess of epichlorohydrin is required. Furthermore, the choice of molecular structures useful as reactants in these condensation reactions is rather limited and, as a matter of fact, all known epoxy polymers of this type involve the use of epichlorohydrin as one of the reactants.

In accordance with the present invention, it is possible to produce a different type of epoxy polymer; namely, epoxidized polymers of olefin hydrocarbons, which possesses characteristics different from those of the epoxy polymers resulting from condensation reactions. The epoxy polymers of this invention may be made in such manner as to possess multiple epoxy groups, both terminal and internal and the position of the epoxy groups along the chain molecule can be varied. This is in contrast to the condensation type epoxy polymers possessing two terminal epoxy groups only and always showing a glycidyl ether structure. Because of the type of reaction employed in making the epoxy polymers of this invention, control of the molecular weight of the end product is possible.

In accordance with the present invention, control of the order of magnitude of the average molecular weight of the final epoxy polymer is subject to control by selection of an initial polymerized olefin hydrocarbon of average molecular weight within the range desired and by the employment of epoxidizing conditions having substantially no further polymerizing action upon the polymer, i. e. the end product possesses an average molecular weight of the same order of magnitude as the unepoxidized polymer. Or, conversely, the epoxidizing conditions may be deliberately chosen to produce a resultant epoxidized polymer of increased average molecular weight above that of the unepoxidized polymer.

The particular polymers changed to the epoxy condition are polymeric olefinic hydrocarbon resins obtained by the polymerization of unsaturated alicyclic fractions of petroleum. Such resins include polymers of cyclic diene compounds such as polymers of cyclopentadiene, for example.

The polymeric olefin hydrocarbons, which are to be epoxidized in accordance with this invention, are derived from cracking petroleum and also acid polymerization of petroleum and petroleum fractions. The cracking of petroleum ordinarily yields gasoline which contains appreciable amounts of polymerizable unsaturates which unsaturates must be removed in order to stabilize the gasoline. The nature of these unsaturated hydrocarbons is very complex and not clearly defined as pointed out by Wakeman, The Chemistry of Commercial Plastics, Reinhold, New York, 1947, pages 296 to 301. These unsaturates are polymerizable. They are, therefore, useful raw materials for the preparation of commercial resins and are of commercial importance. These materials are thought to contain unsaturated alicyclic hydrocarbon structures which account for the fairly high degree of unsaturation. Even though their chemical nature is not well defined, these polymerizable unsaturates are readily available and are marketed under trade names on the basis of specifications which are ordinarily restricted to physical data and percent unsaturation, usually by giving the bromine number, a more accurate measure of unsaturation in compositions of this type than the iodine number.

For example, a useful free-flowing liquid petroleum polymer of this type, which will produce a dry film at room temperature, is freely available on the basis of the following specifications, as given by the manufacturer, The Sun Oil Company:

Specific gravity at 60° F_____ 0.9554
Flash (C. O. C.), deg. F_____ 195
Fire (C. O. C.), deg. F_____ 205
Viscosity, SUS/100 deg. F_____ 230
Viscosity, SUS/210 deg. F_____ 44
Pour point, deg. F_____ −35
Bromine number_____ 80
Iodine number_____ 220
Solids content (ASTM D–154–43)_____ 68%
Initial boiling point, deg. F_____ 375

In other cases, these products are defined only as oxidizing type resins, giving melting point, acid number and specific gravity.

In spite of the lack of knowledge of the actual chemical identity of these products, the petroleum industry, on the basis of widely accepted specifications, is able to supply on demand unsaturated polymeric olefin hydrocarbons of reproducible properties and behavior. That is to say, these products are well defined in terms of arbitrary specifications, although they are admittedly not defined in terms of structural formulae and chemical composition.

The pronounced differences in characteristics between the known condensation type epoxy polymers and the new type of epoxidized hydrocarbon resins of this invention mean that pronounced differences in reactivity and properties between the two types of epoxy polymers exist. The epoxidized hydrocarbon resins of this invention are versatile products able to undergo various useful reactions.

The epoxidized hydrocarbon resins of this invention are generally formed by epoxidation of a polymeric hydrocarbon resin containing two or more double bonds per linear chain. The epoxidation reaction may be performed by employing the known epoxidizing reagents under epoxidizing conditions. The reaction is ordinarily carried out by using an organic peracid, such as peracetic acid, as the epoxidizing agent. Starting with an unsaturated epoxidizing hydrocarbon resin, the epoxidation will produce multiple epoxy groups along the linear chains of such unsaturated polymeric hydrocarbon resins.

As indicated above, production of useful epoxidized hydrocarbon resins in the sense of this invention requires a starting material of a certain minimum chain length, i. e., degree of polymerization. No theoretical upper limit exists for the chain length of the unsaturated starting material to be epoxidized in accordance with this invention. However, there are certain practical considerations which impose a limit on the degree of polymerization of the starting material. Because the epoxidation reaction has to be performed in the liquid phase, the starting material must be either a liquid or a solid soluble in a suitable reaction medium. Many highly polymerized compounds are solids of little or not solubility in otherwise useful solvents and in this respect, a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the epoxidized end product. A highly polymerized starting material will produce an epoxy polymer of somewhat different properties than would be obtained by the use of a starting material of a lower degree of polymerization.

Although unsaturated polymeric hydrocarbon resins obtained by the polymerization of unsaturated alicyclic fractions of petroleum can be used generally as starting materials, it is preferred to employ as materials to be epoxidized, such resins in the average molecular weight range of about 150 to 250,000 or more. The degree of polymerization and molecular weight, determines the physical state of these film-forming resins and their suitability for the production of useful epoxidized hydrocarbon resins depends on their molecular weight, in as much as this, together with the degree of polymerization, will determine its viscosity or its solubility in the reaction medium.

The epoxidation reaction may be carried out in a solvent medium, in which case the resin concentration in the solvent is preferably such that solution viscosity is not too high. The useful solvents are hydrocarbon liquids and the halogenated hydrocarbons, i. e., toluene, benzene, xylene, chloroform and similar organic liquids. It is also possible to carry out the reaction with an aqueous emulsion of the resin. If the resin chosen be liquid at room temperature, then the use of a solvent may be unnecessary.

Epoxidation of these unsaturated polymeric hydrocarbon resins permits production of the corresponding epoxy polymers containing between about 1% and about 3% oxirane oxygen. If the epoxidation reaction be carried out using peracetic acid as the oxidizing agent, then the proper amount of peracid to be used is calculated on the degree of unsaturation of the starting material, determined in a standard fashion as by bromine absorption.

The actual chemical nature and composition of the raw materials considered in this invention plays a minor part only and does not have to be fully known. Suffice it to say that the main requirement for these raw materials is that they contain ethylenic double bonds, are liquids at room temperature or solids soluble in suitable inert solvents and are film-forming. In other words, the particular raw materials considered here; namely, unsaturated polymeric hydrocarbon resins, for the purposes of this invention are sufficiently well defined by viscosity as a measure of degree of polymerization and by bromine number as a measure of unsaturation.

The following examples will serve to illustrate the invention. Example 1 gives a detailed description of a method for producing a particular epoxidized hydrocarbon resin from a film-forming olefin hydrocarbon polymer identified by a bromine number of 51 and a viscosity of 125,000 cp. at 25° C., supplied by the Pan American Refining Corporation under the trade-name Panapol 5D, by reacting such polymer with peracetic acid under epoxidizing conditions.

Example 1

Into a three-necked flask of 500 ml. capacity equipped with a stirrer, thermometer, dropping funnel, cooling and heating system, were placed 100 g. of Panapol 5D dissolved in 100 g. of toluene. To this mixture, kept at about 25° C., was added slowly and with stirring, 72.7 g. of 40% peracetic acid, corresponding to a 20% excess over the stoichiometric amount. This quantity of peracetic acid contained 0.2 g. of dipicolinic acid to act as a stabilizer and 3.2 g. of sodium acetate to adjust and maintain the desired pH value in the mixture. The reaction mixture was then kept at 30° C. for 30 minutes and at 45° C. for an additional 30 minutes. Thereafter, the mixture was cooled to room temperature and carefully washed once with distilled water and then with a saturated solution of sodium chloride containing potassium hydroxide to neutralize residual acid in the mixture. The mixture was then filtered until clear, and excess solvent was removed at room temperature at a pressure of about 1 to 2 mm. The product with a solids content of about 70 to 80% was analyzed and found to contain 2.8% oxirane oxygen.

Example 2

In this example, the epoxidizing conditions and reagent follows in every detail Example 1, but the raw material used was an unsaturated polymeric hydrocarbon resin, solid at room temperature, identified by a bromine number of 71, and a viscosity at 25° C. of 540 cp. in 70% solution in toluene. This resin was supplied by the Pan American Refining Corporation under the trade-name Panarez 3–210. The epoxidized product was analyzed and found to contain about 70 to 80% solids with an oxirane oxygen content of 3.3%.

Example 3

This example follows in every detail Example 1, but the raw material used was a solid unsaturated polymeric hydrocarbon resin identified by an iodine number 220 and a viscosity at 100° F. of 255 SSU, and supplied by the Velsicol Corporation under the trade-name Velsicol AD–21, described as an oxidizing type synthetic resin of petroleum origin. The final epoxidized product was analyzed and found to contain 3.2% oxirane oxygen.

Example 4

This example follows in every detail Example 1, but the raw material used was a solid unsaturated polymeric hydrocarbon resin identified by an iodine number 133 and a viscosity at 25° C. of 14 cp. in 50% solution in toluene, and supplied by the Neville Company under the trade-name Neville LX 685, described as an oxidizing type resin. The epoxidized product was analyzed and found to contain 2.7% oxirane oxygen.

Example 5

This example follows in every detail Example 1, but the raw material used was a solid unsaturated polymeric hydrocarbon resin identified by an iodine number 120 and a viscosity at 25° C. of 18 cp. in 50% solution in toluene, and supplied by the Pennsylvania Industrial Chemical Corporation under the trade-name Piccopale 100, described as an unsaturated hydrocarbon resin. The epoxidized product was analyzed and found to contain 1.5% oxirane oxygen.

Example 6

This example follows in every detail Example 1, but the raw material used was a liquid unsaturated polymeric hydrocarbon resin identified by an iodine number (Wijs)—493 and a viscosity at 100° F. SUS of 76, supplied by the Ethyl Corporation under the trade-name Hydropolymer Oil. The epoxidized product was analyzed and found to contain 1.5% oxirane oxygen.

*Example 7*

This example follows in every detail Example 1, but the raw material used was a liquid unsaturated polymeric hydrocarbon resin identified by an iodine number 220 and a viscosity at 100° F. SUS of 230, supplied by the Sun Oil Company under the trade-name PDO–40 and described as a liquid petroleum polymer composed of polymerized olefinic hydrocarbons. The epoxidized product was analyzed and found to contain 1.2% oxirane oxygen.

In summary, the invention deals with useful epoxidized hydrocarbon resins of average molecular weight between 250 and 250,000, which resins form films and which resins are generally more compatible with other types of film-forming materials than the unepoxidized hydrocarbon resins from which they are formed. The epoxidized hydrocarbon resins contain a small amount of oxirane oxygen which may be several percent and is generally at least 1% by weight. In general, the oxirane content will be in the range 1% to about 4% by weight.

What is claimed is:

1. An epoxidized polymeric olefinic hydrocarbon resin obtained by the polymerization of unsaturated alicyclic fractions of petroleum, said resin having an average molecular weight of 150 to 250,000 and containing at least 1% by weight oxirane oxygen.

2. As a new compound the epoxided reaction product of an organic peracid and a polymeric olefinic hydrocarbon resin obtained by the polymerization of unsaturated alicyclic fractions of petroleum, said resinous reaction product having an average molecular weight of 150 to 250,000 and containing at least 1% oxirane oxygen.

References Cited in the file of this patent

UNITED STATES PATENTS

| | | |
|---|---|---|
| 1,965,191 | Hyman | July 3, 1934 |
| 2,445,644 | Soday | July 20, 1948 |
| 2,461,966 | Davis | Feb. 15, 1949 |
| 2,559,985 | Morris | July 10, 1951 |
| 2,660,563 | Banes | Nov. 24, 1953 |